UNITED STATES PATENT OFFICE.

ALEXIS C. HOUGHTON, OF FAYETTEVILLE, NEW YORK, ASSIGNOR TO SEMET-SOLVAY COMPANY, OF SOLVAY, NEW YORK, A CORPORATION OF NEW YORK.

MANUFACTURE OF PHENOL.

1,308,757. Specification of Letters Patent. Patented July 8, 1919.

No Drawing. Application filed July 9, 1918. Serial No. 244,082.

*To all whom it may concern:*

Be it known that I, ALEXIS C. HOUGHTON, a citizen of the United States, residing at Fayetteville, in the county of Onondaga and State of New York, have invented certain new and useful Improvements in the Manufacture of Phenol, of which the following is a specification.

In the utilization of benzenemonosulfonic acid in the production of phenol as heretofore commercially practised in processes in which the benzenemonosulfonic acid was accompanied by considerable excess of sulfuric acid, it has been necessary to get rid of the excess of sulfuric acid by treating the reaction mixture of benzene and sulfuric acid with lime, with the resulting formation of calcium benzene sulfonate which was in turn treated with sodium carbonate to form sodium benzene sulfonate which required evaporation to approximate dryness by evaporators or drum driers before being fused with caustic soda to form sodium phenoxid.

Where however the benzenemonosulfonic acid is produced by more modern methods, whereby a more complete conversion of the sulfuric acid is effected so that the amount of it remaining in the reaction mixture is small, it is known that the lime treatment may be omitted and the reaction mixture may be treated in the first instance with an alkali, as sodium carbonate, to neutralize the acid mixture and form the sodium salt. In this case the relatively small amount of sodium sulfate formed has no detrimental effect on the subsequent fusion with caustic alkali.

I have discovered that, using a sulfonation reaction mixture such as above described, *i. e.* one consisting mostly of benzenemonosulfonic acid with only a small percentage of free sulfuric acid even the preliminary step of neutralization of the acid mixture with an alkali can be omitted and the reaction mixture can be added directly to the molten caustic soda in the fusion pot, thus still further simplifying the process.

In this case it is necessary to provide for an additional equivalent of sodium hydrate in the fusion pot over what would be used in fusing the sodium salt of benzenemonosulfonic acid in the ordinary way.

In making the fusion in the ordinary way the equation for the reaction is

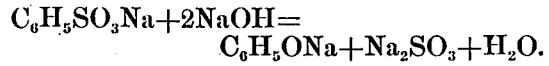
$$C_6H_5SO_3Na + 2NaOH = C_6H_5ONa + Na_2SO_3 + H_2O.$$

In my process the equation for the reaction is

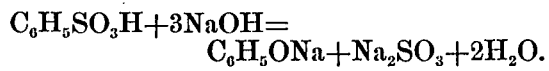
$$C_6H_5SO_3H + 3NaOH = C_6H_5ONa + Na_2SO_3 + 2H_2O.$$

It is probable that the sodium salt of benzenemonosulfonic acid is first formed, which then reacts according to the equation, but by this process the formation and isolation of the sodium salt as a distinct step in the operation is avoided, thereby eliminating the apparatus and labor required for forming the sodium salt prior to the fusion.

The following is a practical example of the working of my process.

In a suitable fusion pot are melted two drums, or 1350 pounds of 76% caustic soda, and the melted caustic is maintained at a temperature of about 300° C.

Into this melted caustic is now run about 1300 pounds of a benzene sulfonation reaction mixture which may contain from 85 to 94 per cent of benzenemonosulfonic acid and from 13 to 2 per cent. or less of sulfuric acid the remainder being water, or, the sulfonation mixture may be diluted with water without affecting the relative proportions of benzenemonosulfonic acid and sulfuric acid.

The sulfonation reaction mixture is added in small streams to insure good distribution and efficient agitation is maintained to avoid any local overheating, due to the heat of neutralization. During the addition the temperature is maintained at between 300° C., and 350° C., and after the addition is completed at a minimum of 350° C., to insure complete reaction. After the reaction is completed the fusion mass is dissolved in water to form a solution of sodium phenoxid from which phenol may then be set free by acidification, in the usual way.

Having thus described my invention, what I claim as new and desire to secure by Letters Patent is:—

1. The improvement in the manufacture of phenol from benzenemonosulfonic acid which consists in adding the benzene sulfonation reaction mixture directly to molten caustic soda without previous neutralization.

2. The improvement in the manufacture of phenol from benzenemonosulfonic acid which consists in neutralizing the benzene sulfonation reaction mixture in a fusion mixture of molten caustic soda.

3. The improvement in the manufacture of phenol from benzenemonosulfonic acid which consists in neutralizing the benzene sulfonation reaction mixture in a fusion mixture of molten caustic soda coincidently with the formation of sodium phenoxid therein.

4. The improvement in the manufacture of phenol from benzenemonosulfonic acid which consists in adding a benzene sulfonation reaction mixture containing an excess of benzenemonosulfonic acid directly to molten caustic soda without previous neutralization.

5. The improvement in the manufacture of phenol from benzenemonosulfonic acid which consists in adding a benzene sulfonation reaction mixture containing an excess of benzenemonosulfonic acid directly to molten caustic soda in excess of the amount required to combine with the benzenemonosulfonic acid without previous neutralization.

In testimony whereof I have affixed my signature, this 25th day of June 1918.

ALEXIS C. HOUGHTON.